(12) United States Patent
Cutrara et al.

(10) Patent No.: US 9,650,957 B2
(45) Date of Patent: May 16, 2017

(54) OIL TANK AND SCAVENGE PIPE ASSEMBLY OF A GAS TURBINE ENGINE AND METHOD OF DELIVERING AN OIL AND AIR MIXTURE TO SAME

(71) Applicant: Pratt & Whitney Canada Corp., Longueuil (CA)

(72) Inventors: Sam Cutrara, Caledon East (CA); Daniel Alecu, Brampton (CA); Patrick Thivierge, St-Basile-le-Grand (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 0 days.

(21) Appl. No.: 15/189,367

(22) Filed: Jun. 22, 2016

(65) Prior Publication Data

US 2016/0305323 A1 Oct. 20, 2016

Related U.S. Application Data

(62) Division of application No. 14/136,686, filed on Dec. 20, 2013, now Pat. No. 9,464,572.

(51) Int. Cl.
- *F02C 7/06* (2006.01)
- *F01M 1/00* (2006.01)
- *B01D 19/00* (2006.01)

(52) U.S. Cl.
CPC ............ *F02C 7/06* (2013.01); *B01D 19/0057* (2013.01); *F01M 1/00* (2013.01); *F05D 2220/32* (2013.01); *F05D 2260/98* (2013.01)

(58) Field of Classification Search
CPC ......... F02C 7/06; B01D 19/0057; F01M 1/00; F05D 2220/32; F05D 2260/98
See application file for complete search history.

(56) References Cited

U.S. PATENT DOCUMENTS

| | | | | |
|---|---|---|---|---|
| 2,766,929 A | * | 10/1956 | Rusch | F04B 39/0094 184/6 |
| 3,630,316 A | | 12/1971 | Sillano | |
| 3,858,685 A | * | 1/1975 | Bono | F04B 39/0246 184/6.16 |
| 4,053,291 A | | 10/1977 | Sims | |
| 4,355,963 A | * | 10/1982 | Tanaka | F04C 29/023 184/6.16 |
| 5,004,407 A | | 4/1991 | Hutchison | |
| 5,088,579 A | * | 2/1992 | Kim | F04B 39/0246 184/6.16 |

(Continued)

*Primary Examiner* — Michael Riegelman
(74) *Attorney, Agent, or Firm* — Norton Rose Fulbright Canada LLP

(57) ABSTRACT

An oil tank and scavenge pipe assembly of a gas turbine engine comprises a tank, and a scavenge pipe having a discharge portion disposed inside the tank. The discharge portion comprises a first portion having first and second ends. The first end is adapted to connect to an oil return line for receiving a mixture of oil and air. A bend extends from the second end downstream thereof relative to a flow of the mixture of oil and air through the scavenge pipe. The bend is configured to cause stratification of the mixture of oil and air as the mixture of oil and air flows through it. An outlet downstream of the bend delivers the mixture of oil and air to the tank. A method of delivering an oil and air mixture to a rotating oil volume of a tank of a gas turbine engine is also presented.

6 Claims, 9 Drawing Sheets

(56) References Cited

U.S. PATENT DOCUMENTS

| | | | |
|---|---|---|---|
| 5,377,781 A * | 1/1995 | Yun | F04B 39/0246 |
| | | | 184/6.23 |
| 5,587,068 A | 12/1996 | Aho, Jr. et al. | |
| 5,842,420 A * | 12/1998 | Khoo | F04B 39/0246 |
| | | | 184/6.16 |
| 6,187,185 B1 * | 2/2001 | Lee | B01D 35/0273 |
| | | | 184/6.24 |
| 6,457,561 B1 * | 10/2002 | Goodnight | F16C 33/1085 |
| | | | 184/6.16 |
| 6,484,846 B1 * | 11/2002 | Parker | F04B 39/0253 |
| | | | 184/6.16 |
| 6,527,086 B2 * | 3/2003 | Oh | F04B 39/0253 |
| | | | 184/6.16 |
| 6,702,067 B2 * | 3/2004 | Iversen | F04B 39/0246 |
| | | | 184/6.16 |
| 6,705,349 B2 | 3/2004 | Themudo | |
| 6,860,365 B2 * | 3/2005 | Stones | F04D 29/063 |
| | | | 184/6.16 |
| 7,017,546 B1 | 3/2006 | Patel et al. | |
| 7,021,425 B2 * | 4/2006 | Noguchi | F04B 39/0253 |
| | | | 184/6.16 |
| 7,063,734 B2 | 6/2006 | Latulipe et al. | |
| 7,441,529 B2 * | 10/2008 | Sotiriades | F01M 1/02 |
| | | | 123/196 W |
| 7,631,729 B2 * | 12/2009 | Tsuchiya | F04B 39/0253 |
| | | | 184/6.5 |
| 8,051,952 B2 | 11/2011 | Bart et al. | |
| 8,201,664 B2 | 6/2012 | Brouillet et al. | |
| 8,292,034 B2 | 10/2012 | Mount et al. | |
| 8,348,017 B2 | 1/2013 | Dickie et al. | |
| 8,746,407 B2 | 6/2014 | Rosca | |
| 2012/0324899 A1 | 12/2012 | DiBenedetto et al. | |
| 2015/0176492 A1 * | 6/2015 | Cutrara | F02C 7/06 |
| | | | 184/106 |

\* cited by examiner

OIL TANK AND SCAVENGE PIPE ASSEMBLY OF A GAS TURBINE ENGINE AND METHOD OF DELIVERING AN OIL AND AIR MIXTURE TO SAME

RELATED APPLICATION

This application is a divisional of U.S. patent application Ser. No. 14/136,686, filed Dec. 20, 2013, the content of which is hereby incorporated by reference.

TECHNICAL FIELD

The application relates generally to oil tanks in gas turbine engines and, more particularly, to scavenge pipes and oil tanks.

BACKGROUND OF THE ART

In a gas turbine engine, different parts of the engine need to be lubricated. An oil system provides the lubrication oil to these different parts. The oil system includes a tank containing the oil to be supplied to the engine by an oil supply line. A scavenge pipe delivers that oil that has been used in the engine back to the tank. During lubrication of the engine, the oil becomes mixed with air, and when the oil is brought back to the tank air bubbles are also carried in. These bubbles can induce the production of foam in the tank, which may clog the air vent of the tank and as a consequence increase the pressure in the tank.

SUMMARY

In one aspect, there is provided an oil tank and scavenge pipe assembly of a gas turbine engine, the assembly comprising: a tank; and a scavenge pipe having a discharge portion, the discharge portion being disposed inside the tank, the discharge portion comprising: a first portion having a first end and a second end, the first end being adapted to connect to an oil supply line for receiving a mixture of oil and air; a bend extending from the second end of the first portion downstream thereof, the bend being configured to cause stratification of the mixture of oil and air as the mixture of oil and air flows through it; and an outlet downstream of the bend delivering the mixture of oil and air from the bend to the tank.

In another aspect, there is provided an oil system of a gas turbine engine, the oil system comprising: an oil supply line carrying oil to the engine; an oil return line carrying a mixture of oil and air from the engine; and an oil tank connected to the oil return line and the oil supply line, an inside of the oil tank receiving a discharge portion of a scavenge pipe of the oil return line, the discharge portion including: first portion connected to the oil return line and receiving the mixture of oil and air from the engine; a bend extending from the first portion downstream thereof, the bend being configured to cause stratification of the mixture of oil and air as the mixture of oil and air flows through it; and an outlet downstream of the bend delivering the mixture of oil and air from the bend to the tank.

In a further aspect, there is provided a method of delivering an oil and air mixture to a rotating oil volume of a tank of a gas turbine engine, the method comprising: carrying the oil and air mixture in a discharge portion of a scavenge pipe disposed inside the tank; at least partially separating the oil from the air by carrying the oil and air mixture in a bend of the discharge portion; and discharging the oil and air mixture to the rotating oil volume through an outlet of the discharge portion downstream of the bend disposed adjacent to a concave curved sidewall of the tank.

DESCRIPTION OF THE DRAWINGS

Reference is now made to the accompanying figures in which.

DETAILED DESCRIPTION

Figure 1:
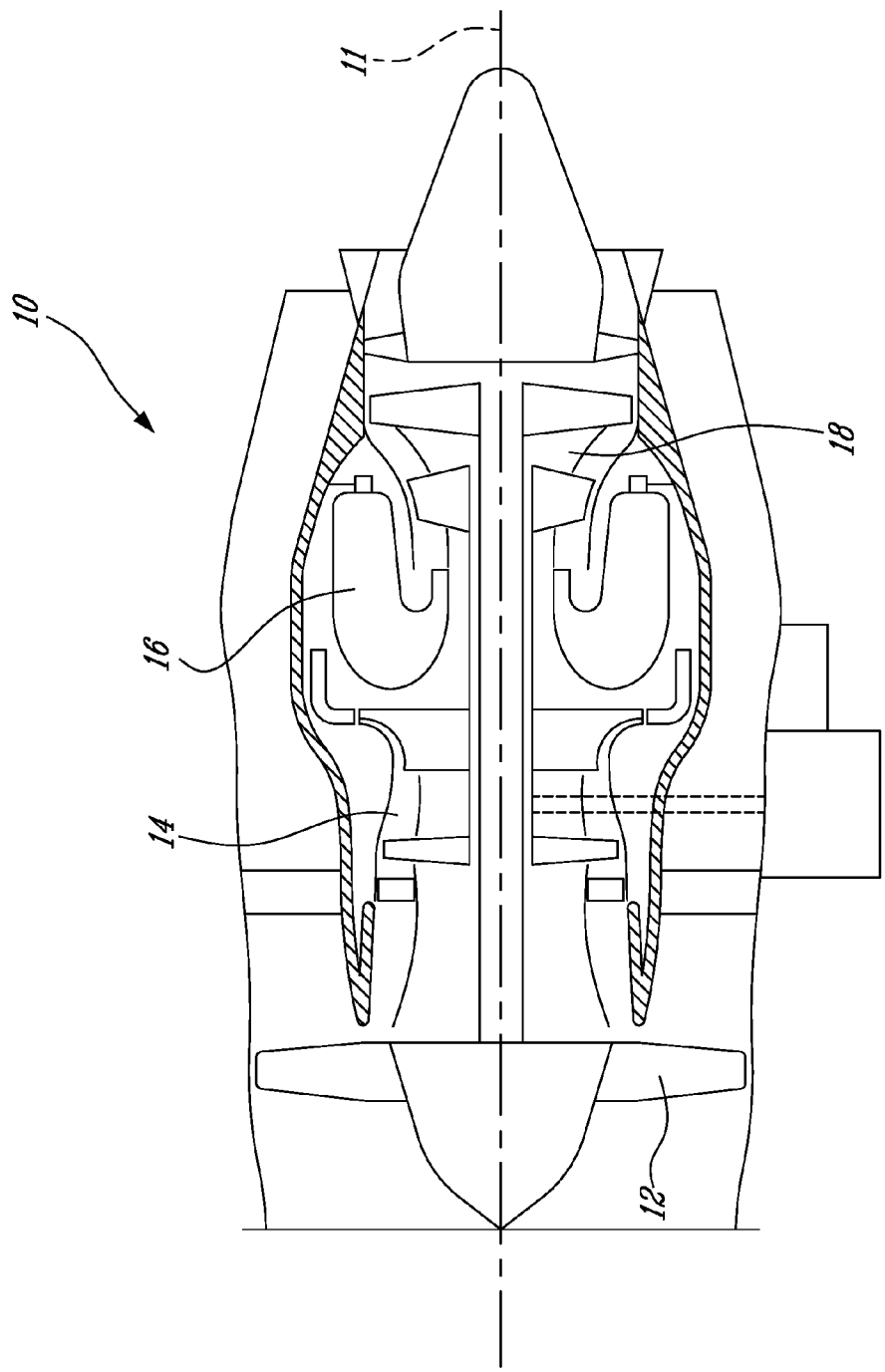
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
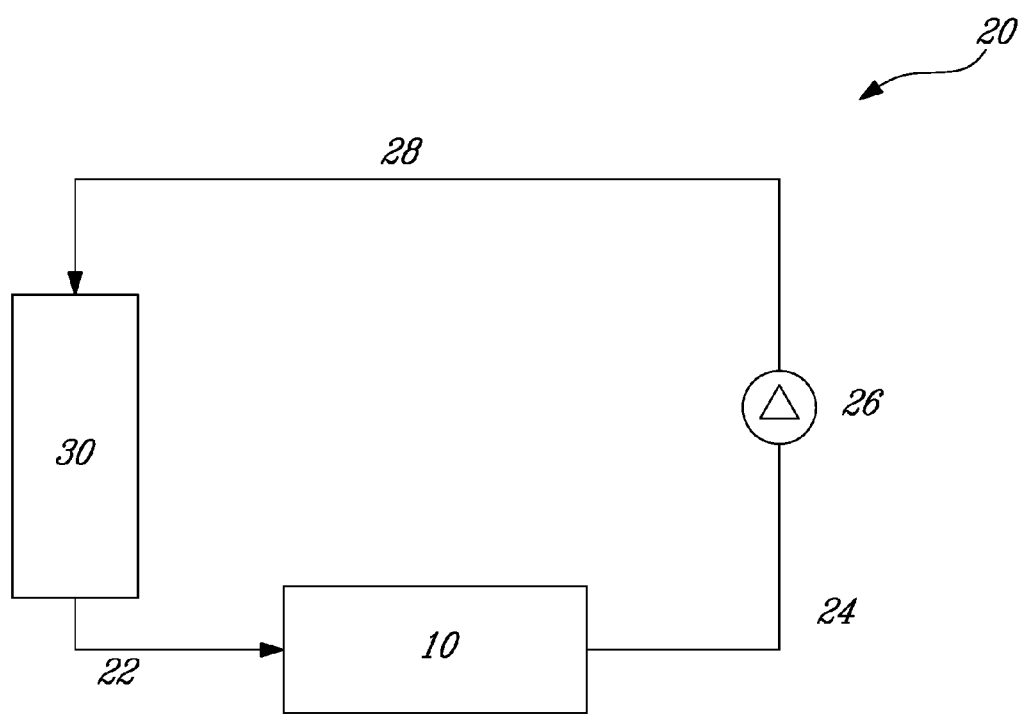
FIG. 2 is a schematic of an oil system for the gas turbine engine of FIG. 1.

FIG. 2 illustrates an oil system 20 that conveys oil to the engine 10. The oil system 20 shown in FIG. 2 is schematic and simplified, and is only one example of oil system that can be used to convey oil to the engine 10. The oil system 20 includes a tank 30 containing the oil to be supplied to the engine 10 by an oil supply line 22. The oil lubricates different parts of the engine 10. Examples of such parts include bearings and gearboxes. During lubrication of the engine 10, oil becomes mixed with air. As a result, the fluid leaving the engine 10 is not only oil but oil mixed with air bubbles. This fluid is carried from the engine 10 to a scavenge pump 26 by fluid line 24. The scavenge pump 26 then imparts momentum to the fluid in order to direct it back to the tank 30 via an oil return line 28.

Figure 3:
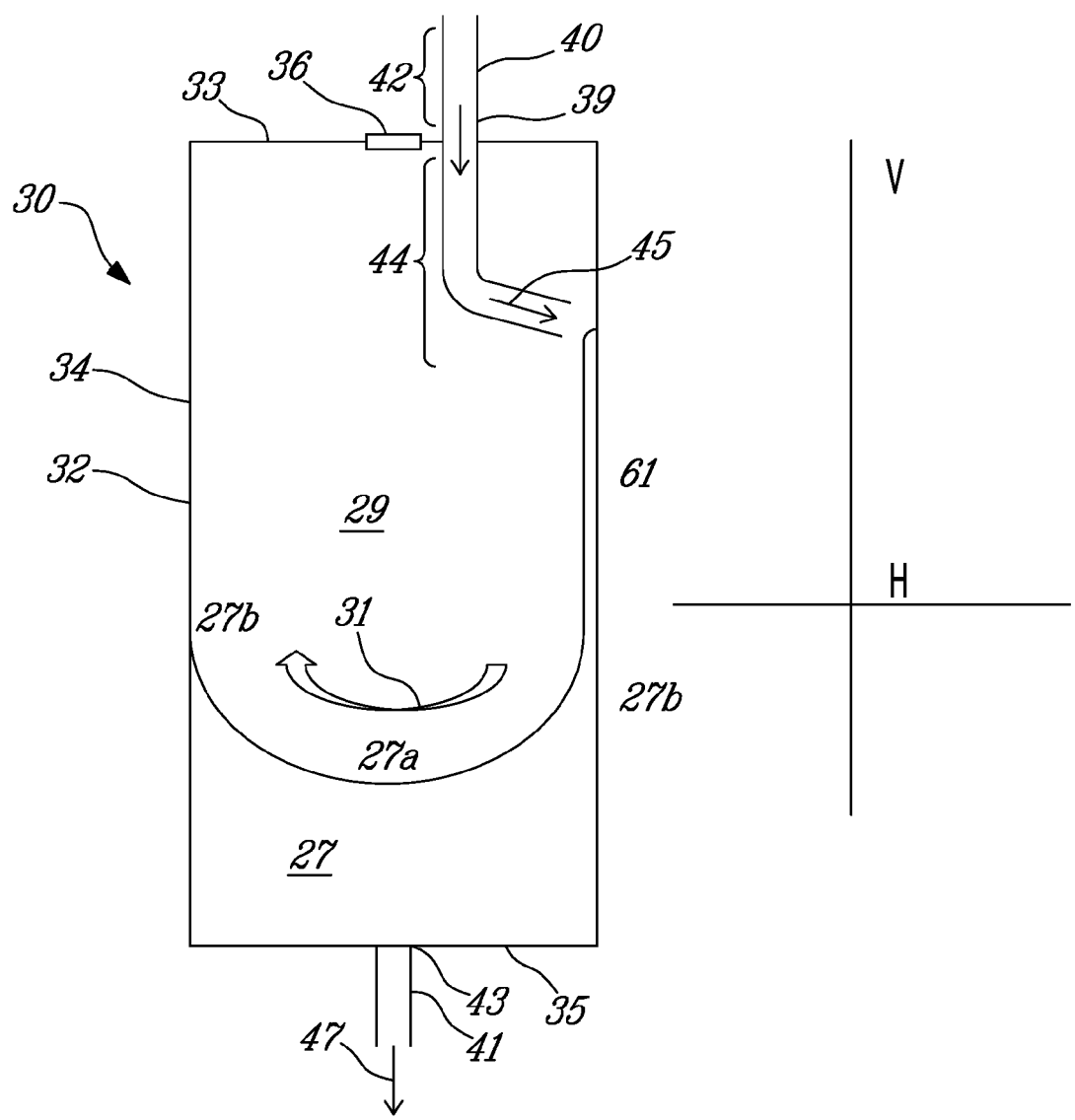
FIG. 3 is a schematic of an oil tank according to a first embodiment for use in the oil system of FIG. 2.
Figure 9:
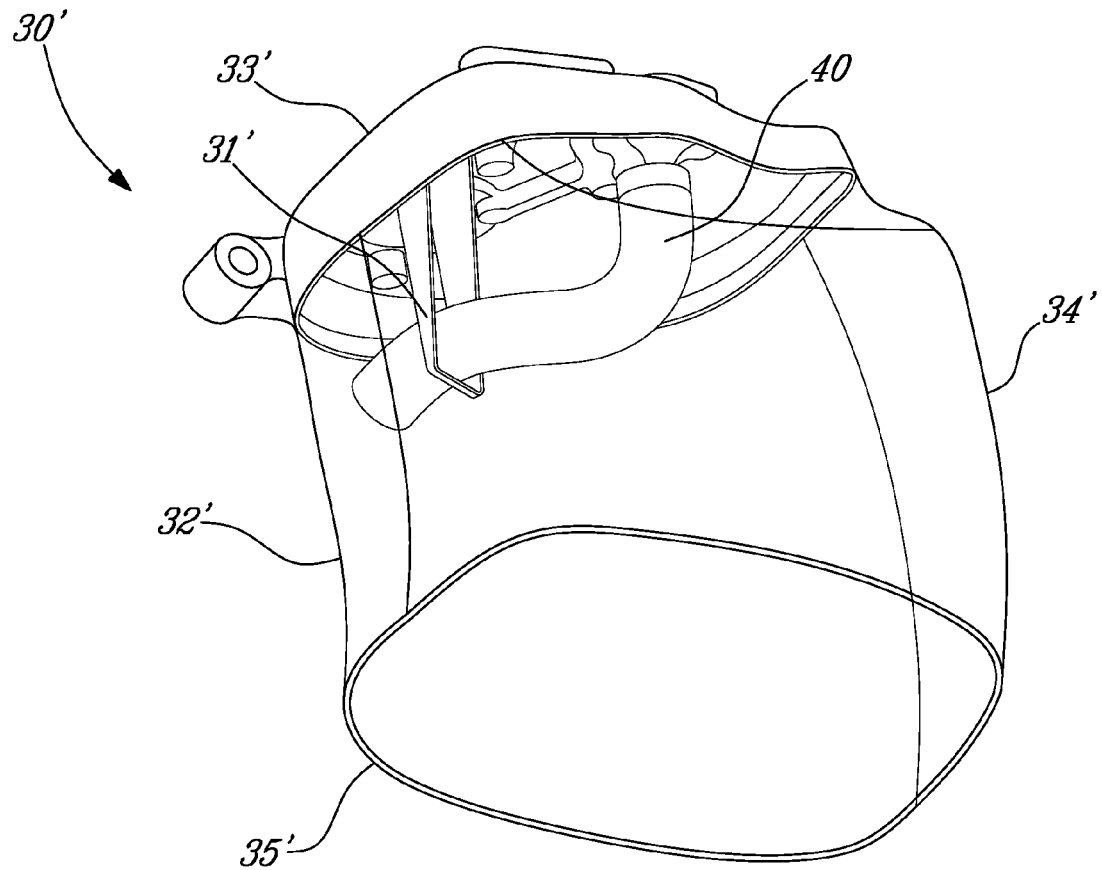
FIG. 9 is a portion of an oil tank according to a second embodiment for use in the oil system of FIG. 2.

Referring to FIG. 3, the tank 30 will be described in greater details. The tank 30 is located in the gas turbine engine 10. The tank 30 has an elongated cylindrical body 32. The body 32 defines a vertical V in a direction of elongation of the body 32 and a horizontal H in a direction perpendicular to the direction of elongation of the body 32. The body 32 has a top 33, a bottom 35 and a cylindrical straight sidewall 34 extending between the top 33 and the bottom 35. The body 32 shown in FIG. 3 is cylindrical, but it is contemplated that the body 32 could have other shapes, as long as the sidewall 34 is somewhat curved in cross-section. For example, FIG. 9 shows a top portion of a body 32' having a non-cylindrical cross-section. The body 32' has a top 33' and a sidewall 34' having a generally curved square cross-section 35'. Furthermore, the sidewall 34' is not straight like the sidewall 34 is, but curved along its direction of elongation. A shape of the body 32 is dictated at least in part by the space available for the tank 30 in the gas turbine engine 10. Other factors influencing the shape of the body 32 include some or all of weight, internal pressure, temperature, fire resistance, cost, fabrication method. These factors may for example influence a shape of the sidewall 34, straight or curved.

The body 32 contains an oil volume 27 of oil, which supplies the oil supply line 24. The body 32 also contains an air volume 29 of air incoming from the oil return line 28, which as discussed above carries a mixture of oil and air. The oil volume 27 is disposed toward the bottom 35 of the body 32, while the air volume 29 is disposed toward the top 33 of the body 32. The oil volume 27 is rotating inside the tank 30 as illustrated by arrow 31. The rotation of the oil volume 27 is not due to a rotation of the tank 30, but rather by a momentum that is imparted by the oil as released from the oil return line 28 into the tank 34. The rotating oil volume 27 is a free vortex having a dip 27a at its center and elevated sides 27b at the sidewall 34. FIG. 3 is schematic and the vortex may differ from shown therein. The air volume 29 may vary from 2 to 20 times the air volume 27 in the tank 30.

The body 32 includes three apertures, namely an air vent 36 and a scavenge pipe 40 connection 39 at the top 33 of the body 32, and an oil supply pipe 41 connection 43 at the bottom 35 of the body 32. The air vent 36 is disposed at a center of the top 33. The air vent 36 is positioned above the oil level. According to the embodiment of tank shown in FIG. 3, the air vent 36 is disposed above the dip 27a of the oil volume 27 which is a lowest point of the oil volume 27 for minimizing oil that would involuntarily enter the vent 36. It is contemplated however, that the air vent 36 could be disposed elsewhere on the body 32. For example, the air vent 36 could be on a side of the top 33 or on a top portion of the sidewall 34, as long as the air vent 36 is disposed in the air volume 29 so as to effectively extract air and not oil form the tank 30. The air vent 36 maintains a minimum pressure in the tank 30 and releases air if the pressure in the tank 30 exceeds a predetermined pressure. The air vent 36 shown in the Figures is a calibrated orifice. It is contemplated that the air vent 36 could be a pressure regulator other than a calibrated orifice. For example, the air vent 36 could be a pressure regulating valve or a pressure relief valve.

The scavenge pipe 40 connects perpendicularly to the top 33 of the body 32 at the connection 39. The scavenge pipe 40 carries fluid, i.e. the mixture of oil and air, from the oil return line 28 from the scavenge pump 26 to the tank 30 (arrow 45). The scavenge pipe 40 includes an external pipe portion 42 disposed outside of the body 32 and an internal discharge portion 44 disposed within the body 32, in the air volume 29 of the tank 30. In addition of carrying the fluid back to the tank 30, the discharge portion 44 of the scavenge pipe 40, which will be described below, is designed to separate at least partially the air from the oil in the mixture, and to reduce a hydraulic jump when oil is returned to the oil volume 27. The connection 39 to the scavenge pipe 40 is disposed at the top 33 of the body 32, off-set from the air vent 36. It is contemplated that the connection 39 could be disposed elsewhere on the body 32. For example, the connection 39 could be on the sidewall 34. It is also contemplated that the scavenge pipe 40 could connect with the top 33 at an angle other than 90 degrees. Although the discharge portion 44 is shown in FIGS. 4 to 8 to be connected to the tank body 32 only by the connection 39, it is contemplated that additional connections could support the discharge portion 44 inside the tank 40. The embodiment of the tank body 32' shown in FIG. 9 shows such example with the use of a support 31' extending from the top 33' to the internal pipe portion 44.

The oil supply pipe's 41 connection 43 is disposed at the bottom 35 of the body 32. The oil supply line 43 evacuates oil from the oil volume 27 and directs it to the engine 10 (arrow 47).

Turning now to FIGS. 4 to 8, the discharge portion 44 of the scavenge pipe 40 will now be described in detail.

The fluid entering the discharge portion 44 of the scavenge pipe 40 being oil with air bubbles, it constitutes a foam precursor if released directly into the tank 30. In order to control the foam, which may cause the air vent 36 to clog and/or to release oil instead of air only which in turn will increase pressure in the tank 30, the discharge portion 44 is designed to limit factors that would lead to foam formation. In particular, the discharge portion 44 includes a first bend which stratifies the flow and separates the air from the oil for the fluid, and a second optional bend which insures that the flow remains stratified until it is discharged to the oil volume 27.

Figure 4:
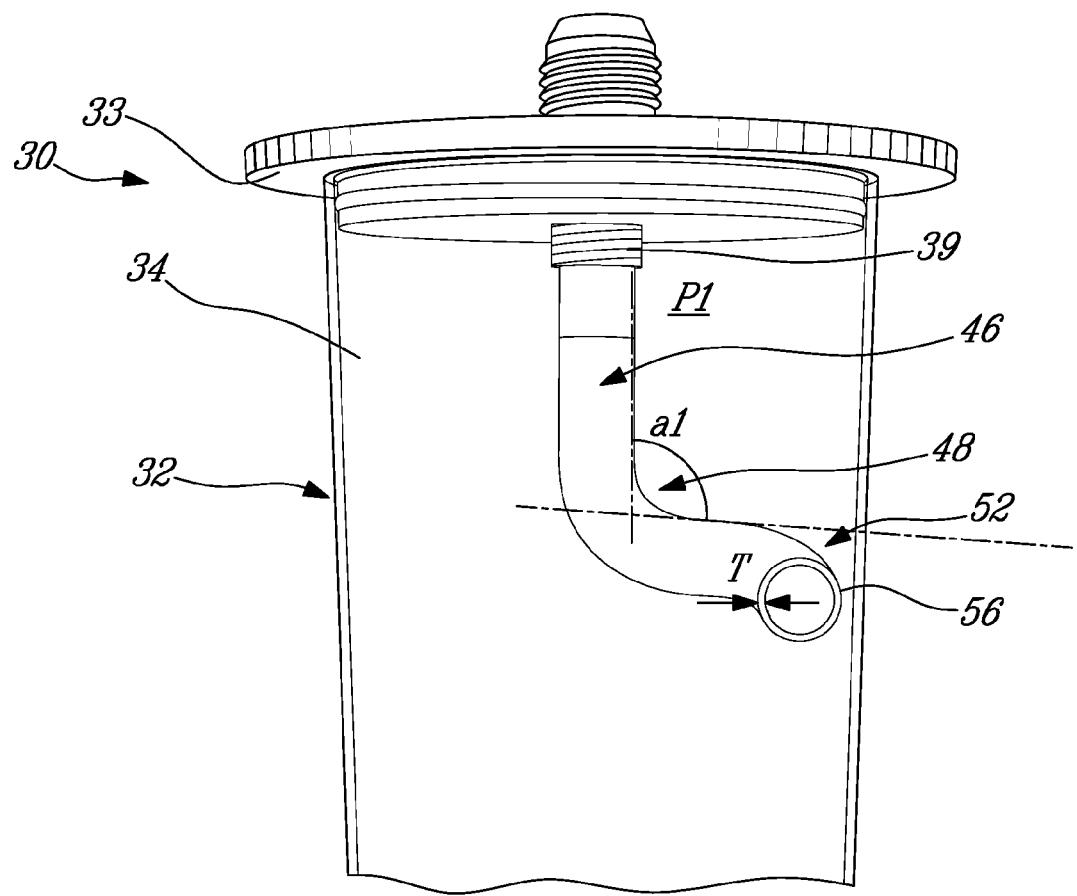
FIG. 4 is a picture of a top of the oil tank of FIG. 3 shown transparent to reveal a portion of a scavenge pipe extending within the oil tank.
Figure 5:
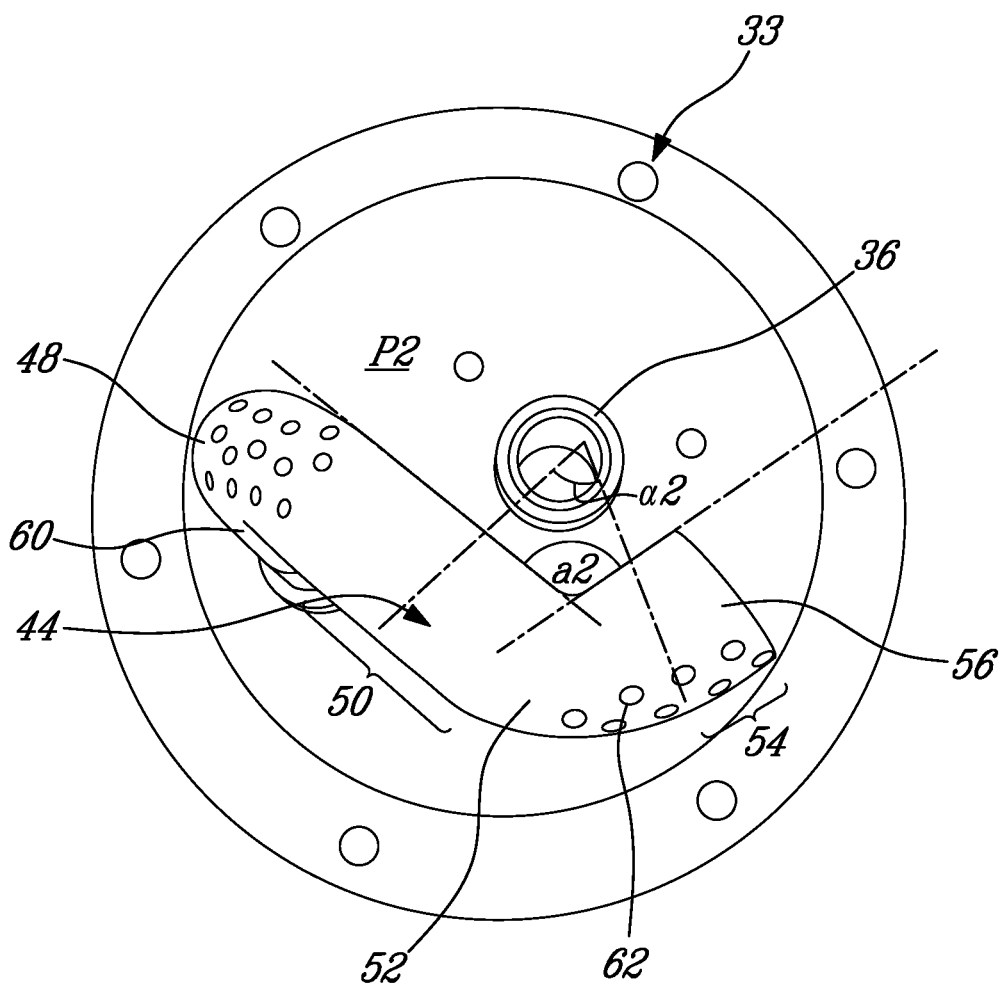
FIG. 5 is a bottom plan view of the portion of the scavenge pipe of FIG. 4.
Figure 6:
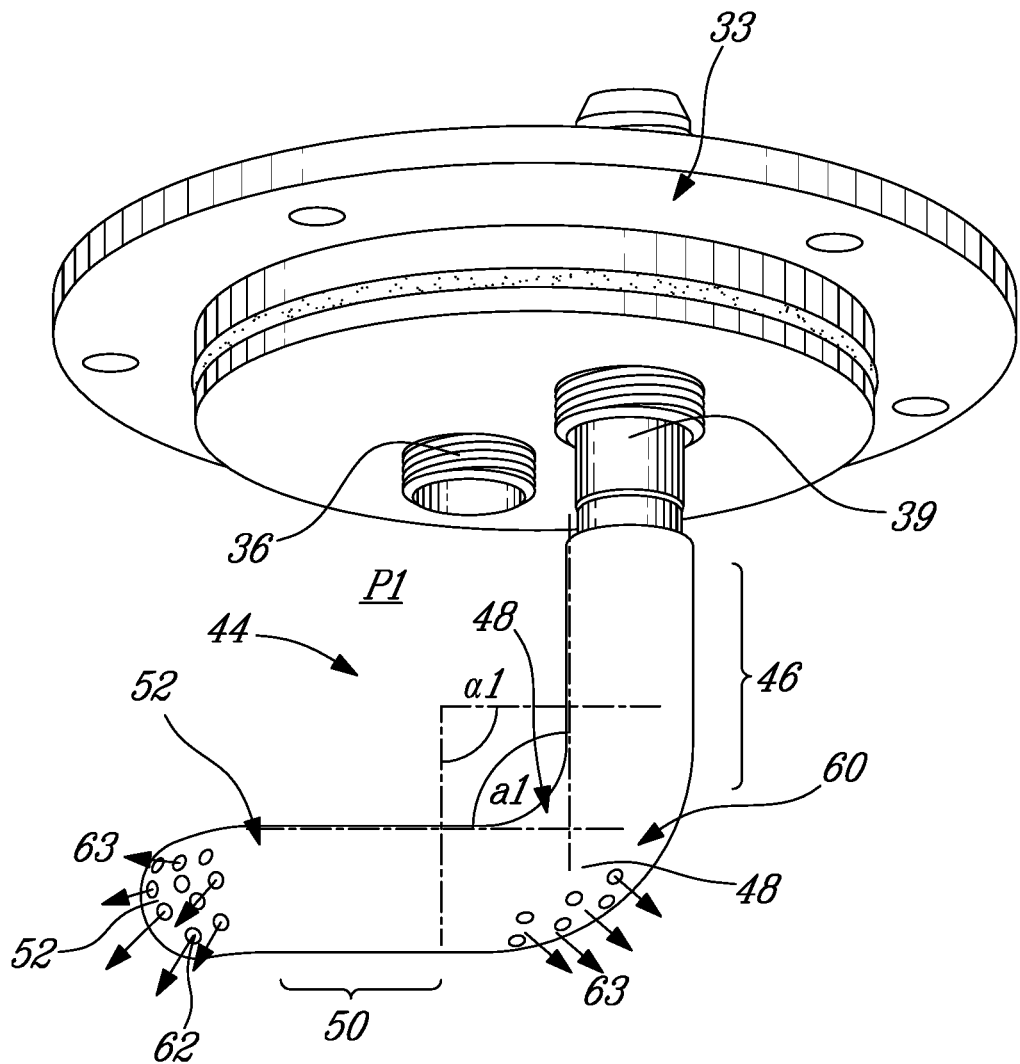
FIG. 6 is a bottom perspective view of the top of the oil tank of FIG. 3.
Figure 7:
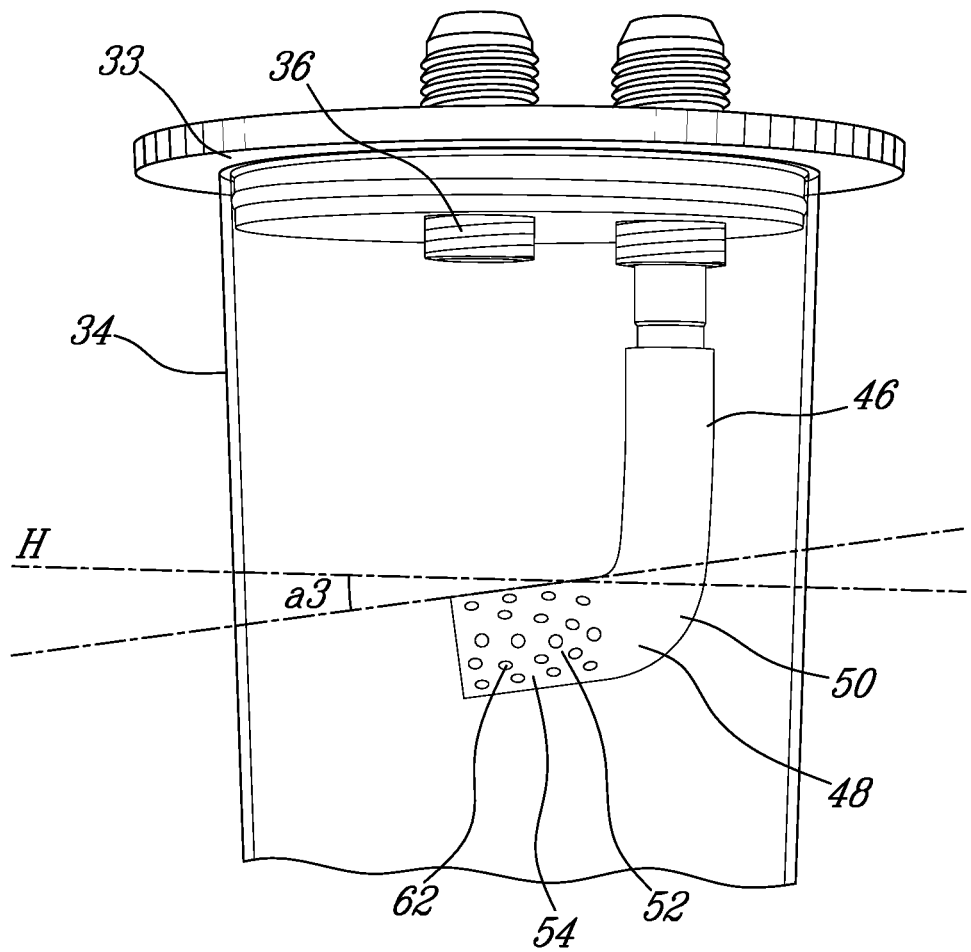
FIG. 7 is a side elevation view of the top of the oil tank of FIG. 3.
Figure 8:
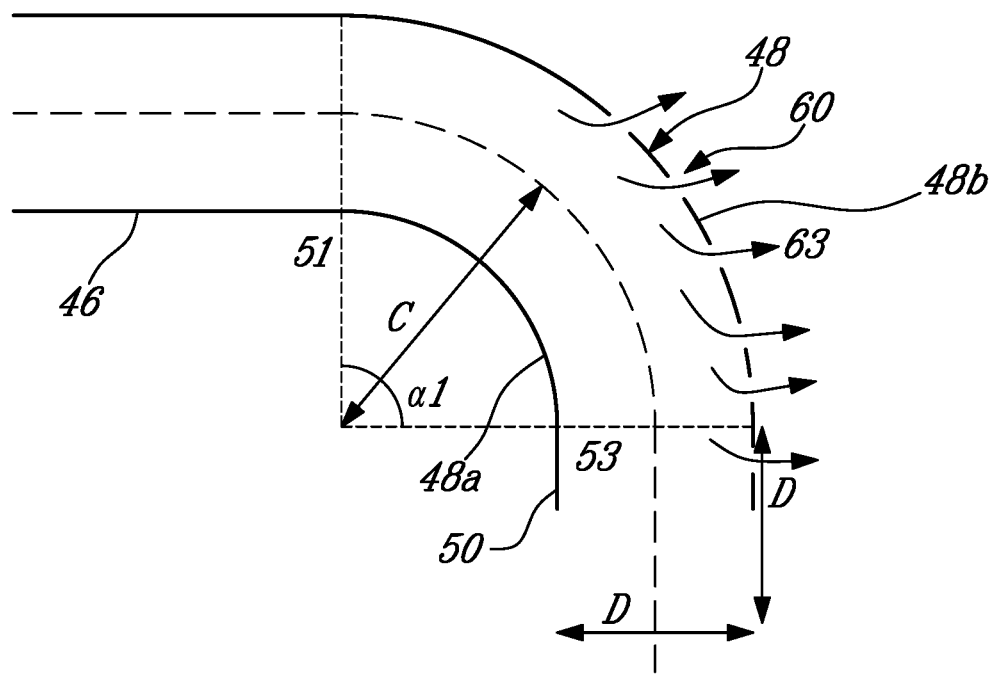
FIG. 8 is a schematic of a portion of the scavenge pipe of FIG. 4.

As best shown in FIG. 4, the discharge portion 44 includes a first portion 46 extending from the top 33 of the body 32 of the tank 30 to a first bend 48. As best shown in FIG. 5, the discharge portion 44 includes a second portion 50 extending from the first bend 48 to a second bend 52. The first 46 and second 50 portions are generally straight and form together an angle a1 of about 90 degrees. It is contemplated that the angle a1 could be greater than 90 degrees but lower than 180 degrees. As best shown in FIG. 8, the first bend 48 starts at an inception 51 and finishes at an end 53. The inception 51 and the end 53 of the bend 48 are locations where a radius of curvature C of the discharge portion 44 changes. The inception 51 of the bend 48 corresponds to an end of the first portion 46, while the end 53 of the bend 48 corresponds to an end of the second portion 50. In the embodiment described herein, the first portion 46 and the second portion 50 being straight, they have an infinite radius of curvature, while the bend 48 has a definite radius of curvature. It is contemplated however, that the first portion 46 and the second portion 50 could have some radius of curvature. Another way to characterise the bend 48 is to define it by an angle $\alpha 1$ between a perpendicular to the first bend 48 at the inception 51 and a perpendicular to bend 48 at the end 53. In the embodiment shown in the Figures, the angle $\alpha 1$ of the bend 48 is 90 degrees. It is contemplated that the angle $\alpha 1$ could be at least 70 degrees. When the first bend 48 has a constant radius of curvature C, as does the example shown in the Figures, the perpendiculars of the first bend 48 at the inception 51 and end 53 correspond to radiuses of the first bend 48. The radius of curvature C of the first bend 48 may be 2 to 3 times a diameter D of the first portion 46.

The first portion 46, the first bend 48, and the second portion 50 are contained in a common plane P1. In the discharge portion 44 shown in FIGS. 4 to 8, the plane P1 is a vertical plane. It is contemplated that the plane P1 could not be vertical should the discharge portion 44 be connected to the top 33 of the body 32 of the tank 30 at an angle other than 90 degrees. It is contemplated that the second portion 50 could be omitted and that the first bend 48 could be directly connected to the second bend 52.

The second bend 52 extends between the second portion 50 and a third portion 54, and is fairly similar to the first bend 48 except that it is located in a plane different from the one of the bend 48. The third portion 54 is at an angle a2 of 90 degrees with the second portion 50. It is contemplated that the angle a2 could be greater than 90 degrees but lower than 180 degrees. An angle α2 of the second bend 52, defined to be the angle between a perpendicular to the second bend 52 at its inception and a perpendicular to the second bend 52 at its end (not shown in the Figures but similar to what has been described for α1), is 80 degrees in the embodiment shown in the Figures. It is contemplated that the angle α2 could be within 80 to 120 degrees range. A sum of the angles α1 and α2 is 180 degrees. It is contemplated that the sum of the angles α1 and α2 could be any value above 90 degrees. It could even be 400 degrees, should the discharge portion 44 swirls on itself. It is contemplated that the second bend 52 could be omitted, and that the discharge portion 44 would only have the bend 48.

The third portion 54 is straight and extends from the second bend 52 to a free end, or outlet, 56 of the internal portion 44. It is contemplated that the third portion 54 could be curved. It is also contemplated that the third portion 54 could be omitted and that the first bend 48 or the second bend 52 connect directly with the outlet 56. The second portion 50, the second bend 52, and the third portion 54 are contained in a common plane P2. In the embodiment shown in the Figures, the third portion 54 is inclined at an angle a3 of 10 degrees relative to the horizontal H, and oriented toward the oil volume 29. As such, an angle between the first plane P1 and the second plane P2 is 100 degrees. It is also contemplated that the angle a3 could be within a 10 to 20 degrees range from the horizontal, and that as a result, the angle between the first plane P1 and the second plane P2 could be between 100 and 110 degrees. It is contemplated that the plane P2 could be at a different angle with respect to the plane P1. For example, the plane P2 could form with the plane P1 an angle of 70 or 100 degrees. It is also contemplated that the planes P1 and P2 could be coplanar and that the bends 48, 52 could form a U-turn.

The third portion 54 is disposed tangential a concave curved portion of the sidewall 34, and is oriented such that the outlet 56 is disposed near the sidewall 34, in the direction of rotation 31 of the oil volume 27. It is contemplated that the outlet 56 could abut the sidewall 34, or that the outlet 56 could be disposed elsewhere in the tank 30.

Although the embodiment shown in FIGS. 4 to 8 shows that the discharge portion 44 has two bends 48, 52, it is contemplated that the discharge portion 44 of the scavenge pipe 40 could have only one or more than two bends, as long as the bend(s) ensure some stratification of the flowing fluid.

With reference to FIG. 8 where the bend 48 is schematically illustrated, the bends 48, 52 will now be described in details. The bend 52 being similar to the bend 48, reference will be made to the bend 48 only.

The bends 48 (resp. 52) include a plurality of perforations 60 (resp. 62). The perforations 60 are disposed on the outside 48b of the bend 48. An outside of a bend in a portion of the bend the farthest away from a center of the turn at a given radius of the bend. The perforations 60 allow a portion of the oil of the fluid delivered by the scavenge pipe 40 to be ejected from the scavenge pipe 40 (arrow 63) (i.e. bleeding). An area of the discharge portion 44 having the perforations 60 starts at 45 degrees downstream the bend's 48 inception 51 and continues until one diameter D after the end 53 of the bend 48. It is contemplated that the perforations 60 could be contained in an area smaller than described above. For example, the perforations 60 could be contained only between the inception 51 and the end 53 of the bend 48.

A diameter of the perforations 60 is equal to a thickness T of the internal pipe portion 44. While other dimensions of the perforations 60 are contemplated, smaller perforations tend to create jets of oil while larger perforations release air in addition to oil, as opposed to oil only. The perforations 60 are a means to provide energy dissipation to the fluid before it reaches the outlet 56. A preferred number of the perforations 60 can be found by trial and error. Too few perforations will not provide enough energy dissipation, while a too large number of perforations would release air in addition to oil, as opposed to oil only.

Although the embodiment shown in FIGS. 4 to 8 shows that each bend 48, 52 has perforations, it is contemplated that only one of the bends 48, 52 or none of the bends 48, 52 could have perforations.

Flow in the discharge portion 44 is as follow. The mixture of air and oil enters the discharge portion 44 and flows substantially unaltered through the first portion 46. As the fluid enters the first bend 48, it is accelerated by the curvature of bend 48. The relatively low centrifugal acceleration (2 to 3 g in the embodiment shown herein) provided by a geometry of the bend 48 forces the air trapped in bubbles to separate from the oil. Oil being heavier than air, oil accumulates on an outside 48b of the bend 48, while the air bubbles have tendency to accumulate on an inside 48a of the bend 48. As the mixture travels on the outside 48b of the bend 48, it is being released by the perforations 60 so as to decrease the amount of oil exiting through the outlet 56 and in turn decrease an impact of the hydraulic jump. The fluid then flows in the second portion 50 substantially unaltered from its states when leaving the first bend 48. The fluid reaches the second bend 52 which has a substantially same effect on the fluid than the first bend 48 does. In short second portions 50, the fluid does not have time to reform as a mixture, remains somehow stratifies, and the second bend 52 ensures that the fluid keeps the stratification until it reaches the outlet 56. In long second portions 50, the fluid may have time to reform as a mixture, may loose of its stratification, and the second bend 52 ensures that the fluid regain the stratification until it reaches the outlet 56. The fluid flows from the second bend 52 into the third portion 54 and the remaining of the mixture is expelled from the outlet 56 to flow along the sidewall 34 (as illustrated by reference numeral 61 in FIG. 3). The oil expelled by the outlet 56 feeds the vortex of the oil volume 27, while the air feeds the air volume 29. Some foam may appear in the oil volume 27. The somewhat smooth transition from the outlet 56 to the oil volume 27 using the sidewall 34 reduces the hydraulic jump. The hydraulic jump contributes to foam formation, which as discussed above could impart to an optimal functionality of the tank 30. A tangential discharge of the fluid as described herein could even eliminate the hydraulic jump.

With the oil return system described herein having a scavenge pipe having a portion extending in the tank being shaped and positioned within the tank to separate flow and reduce hydraulic jump, there is no need of a cyclonic de-aerator. The bubbly oil of the oil return line is separated into air and oil by the bends. Perforations in the pipe release oil and dissipate energy of the oil before it reaches the oil volume, thereby reducing form formation. With a reduce foam presence, air can be released by the air vent without the air vent being chocked by the foam. Using the scavenge pipe described above may provide a simpler design compared to traditional de-aerators. It may be more compact, lighter and more economical than having a de-aerator associated with the tank. Performance may be equivalent or even better than traditional de-aerators. For example, the above described tank may be 20% lighter of a similar performance cyclonic de-aerator and may fit in a smaller envelope. Further, with the scavenge pipe described above, only limited modifications of existing system need to be performed. Such modifications include replacing current scavenge pipes with the scavenge pipe described herein. In addition to reducing foam formation, the combined use of the perforations and the disposition of the outlet may avoid feeding the vortex of oil and avoid the dip of the oil volume to coincide with the oil supply line, in which case the oil supply line would carry air to the engine instead of purely oil.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of delivering an oil and air mixture to a rotating oil volume of a tank of a gas turbine engine, the method comprising:
carrying the oil and air mixture in a discharge portion of a scavenge pipe disposed inside the tank;
at least partially separating the oil from the air by carrying the oil and air mixture in a bend of the discharge portion, including bleeding a portion of the oil contained in the oil and air mixture through perforations defined on an outside of the bend as the oil and air mixture flows through the bend; and
discharging the oil and air mixture to the rotating oil volume through an outlet of the discharge portion downstream of the bend and disposed adjacent to a concave curved sidewall of the tank.

2. The method as defined in claim 1, wherein discharging the oil and air mixture through the outlet of the discharge portion comprises discharging the oil and air mixture in a direction of rotation of the mixture.

3. The method as defined in claim 1, comprising gradually releasing oil from the scavenge pipe through the perforations.

4. The method as defined in claim 1, comprising using centrifugal acceleration forces as the oil and air mixture flows through the bend to separate air from liquid oil.

5. The method defined in claim 1, using a geometry of the bend to cause stratification of the mixture of the oil and air as the mixture flow through the bend.

6. The method defined in claim 1, comprising discharging the mixture of oil and air in a direction of rotation of an oil vortex in the tank.

* * * * *